US008566325B1

(12) United States Patent  
Brewington (10) Patent No.: US 8,566,325 B1  
(45) Date of Patent: Oct. 22, 2013

(54) BUILDING SEARCH BY CONTENTS

(75) Inventor: Brian Edmond Brewington, Fort Collins, CO (US)

(73) Assignee: Google Inc., Mountain View, CA (US)

( * ) Notice: Subject to any disclaimer, the term of this patent is extended or adjusted under 35 U.S.C. 154(b) by 49 days.

(21) Appl. No.: 12/977,494

(22) Filed: Dec. 23, 2010

(51) Int. Cl.  
  *G06F 17/30* (2006.01)
(52) U.S. Cl.  
  USPC .......................................... 707/743; 707/737
(58) Field of Classification Search  
  USPC ......................... 707/3, 2, 737, 743; 455/457  
  See application file for complete search history.

(56) References Cited

U.S. PATENT DOCUMENTS

| | | | |
|---|---|---|---|
| 5,737,533 A | 4/1998 | de Hond | |
| 6,256,043 B1 | 7/2001 | Aho et al. | |
| 6,308,144 B1 | 10/2001 | Bronfeld et al. | |
| 7,336,274 B2 | 2/2008 | Kida | |
| 7,353,114 B1 * | 4/2008 | Rohlf et al. | 702/5 |
| 7,570,261 B1 | 8/2009 | Edecker et al. | |
| 7,698,336 B2 | 4/2010 | Nath | |
| 7,712,052 B2 | 5/2010 | Szeliski et al. | |
| 7,882,286 B1 * | 2/2011 | Natanzon et al. | 710/74 |
| 7,933,897 B2 | 4/2011 | Jones et al. | |
| 2002/0070981 A1 | 6/2002 | Kida | |
| 2005/0073585 A1 * | 4/2005 | Ettinger et al. | 348/155 |
| 2005/0128212 A1 | 6/2005 | Edecker et al. | |
| 2006/0004512 A1 | 1/2006 | Herbst et al. | |
| 2006/0271280 A1 | 11/2006 | O'Clair | |
| 2007/0076920 A1 | 4/2007 | Ofek | |
| 2007/0208719 A1 * | 9/2007 | Tran | 707/3 |
| 2007/0210937 A1 | 9/2007 | Smith et al. | |
| 2007/0250477 A1 * | 10/2007 | Bailly | 707/2 |
| 2007/0273558 A1 | 11/2007 | Smith et al. | |
| 2007/0273758 A1 | 11/2007 | Mendoza et al. | |
| 2008/0002916 A1 | 1/2008 | Vincent et al. | |
| 2008/0033641 A1 | 2/2008 | Medalia | |
| 2008/0268876 A1 * | 10/2008 | Gelfand et al. | 455/457 |
| 2009/0132646 A1 | 5/2009 | Yang et al. | |
| 2009/0315995 A1 | 12/2009 | Khosravy et al. | |
| 2010/0076976 A1 * | 3/2010 | Sotirov et al. | 707/737 |
| 2010/0250120 A1 | 9/2010 | Waupotitsch et al. | |
| 2010/0257163 A1 | 10/2010 | Ohazama et al. | |
| 2010/0305855 A1 | 12/2010 | Dutton et al. | |
| 2011/0137561 A1 * | 6/2011 | Kankainen | 701/300 |
| 2011/0270517 A1 | 11/2011 | Benedetti | |
| 2011/0283223 A1 | 11/2011 | Vaittinen et al. | |

OTHER PUBLICATIONS

International Search Report and Written Opinion, PCT/US10/34692, dated Jul. 1, 2010.  
International Search Report and Written Opinion for Application No. PCT/US2011/066009 dated May 22, 2012.  
International Search Report and Written Opinion for Application No. PCT/US2011/066109 dated Sep. 27, 2012.

* cited by examiner

*Primary Examiner* — James Trujillo  
*Assistant Examiner* — Thong Vu  
(74) *Attorney, Agent, or Firm* — Lerner, David, Littenberg, Krumholz & Mentlik, LLP (57) ABSTRACT

Aspects of the invention relate generally to identifying and providing 3D models in response to a search request. More specifically, a server may access a database of 3D models, at least some of which include geolocation information such as an address, intersection, or geolocation coordinates. The server may select a particular model and identify points of interest. For example, the server may use detailed map information to identify points of interest located at or near the geolocation information associated with the particular model. Once a point of interest has been identified, a corresponding system tag may be generated and associated with the 3D model. Tags may be used to index, search, and retrieve 3D models in response to a search request. For example, when a request for a 3D model is received, the server identifies the search terms and searches the tags to identify relevant 3D models.

15 Claims, 8 Drawing Sheets

BUILDING SEARCH BY CONTENTS

BACKGROUND OF THE INVENTION

Various Internet-based services allow users to upload and share three-dimensional ("3D") models of various objects such as the buildings, stadiums, ships, vehicles, lakes, trees, etc. The objects may be associated with various types of user-provided information such as titles, descriptive data, user reviews, business listings, etc. Many of the objects and the models themselves, for example buildings or parks, may be geolocated or associated with a geographic location such as an address or geolocation coordinates. Models may also be categorized by users. For example, a model of a sky-scraper may be associated with one or more user designated collections such as sky-scrapers, buildings in a particular city, etc. In this regard, a user may request models, and the service may search the database for models, for example, titles, geographic locations, descriptions, object types, collections, physical features, etc. for instances of the search terms in order to identify relevant search results. The results may be sent back to the user who may select a model to obtain further information.

Once a user has selected a 3D model, the user may interact with the model. For example, a user may query the database for "the Eiffel Tower" and in response receive a list of search results including various models of the Eiffel Tower, in Paris, France, as well as other objects associated with or indexed by the search terms. Once a user has selected an object, for example, by clicking on a search result, the user may, among other actions, download, view, rotate, or comment on the model.

BRIEF SUMMARY OF THE INVENTION

Aspects of the invention relate generally to identifying and providing 3D models in response to a search request. More specifically, a server may access a database of 3D models, at least some of which include geolocation information such as an address, intersection, or geolocation coordinates. The server may select a particular model and identify points of interest. For example, the server may use detailed map information to identify points of interest located at or near the geolocation information associated with the particular model. Once a point of interest has been identified, a corresponding system tag may be generated and associated with the 3D model. Tags may be used to index, search, and retrieve 3D models in response to a search request. For example, when a request for a 3D model is received, the server identifies the search terms and searches the tags to identify relevant 3D models.

One aspect of the invention provides a computer-implemented method for generating tags. The method includes accessing a database of 3D models of objects, a plurality of the 3D models each being associated with a respective geographic location; accessing map information including geolocated points of interest; selecting a 3D model of an object associated with a first respective geographic location; identifying, by a processor, a point of interest from the map information based on the first respective geographic location; generating, by the processor, a system tag including a search term based on the identified point of interest; associating the system tag with the selected 3D model of an object; and storing the association in memory.

In one example, first respective geographic location is a point within a boundary of a building. In another example, the selected 3D model of the object includes a building. In another example, the database of 3D models of objects includes a search index, and the method also storing the system tag in the search index. In another example, the search term is a title of the point of interest. In another example, the method also includes receiving, from a device, a request for one or more 3D models of objects including the search term; identifying, by the processor, the system tag based on the received search term; identifying the selected 3D model of the object based on the identified system tag; and transmitting the selected 3D model of the object to the device.

Another aspect of the invention provides a computer. The computer includes memory storing a database of 3D models of objects and a plurality of the 3D models each being associated with a respective geographic location. The memory also stores map information including geolocated points of interest. The computer also includes a processor coupled to the memory. The processor is operable to select a 3D model of an object associated with a first respective geographic location; identify a point of interest from the map information based on the first respective geographic location; generate, by the processor, a system tag including a search term based on the identified point of interest; associate the system tag with the selected 3D model of an object; and store the association in the memory.

In one example, the first respective geographic location is a geolocated boundary of a building. In another example, the selected 3D model of the object includes a building. In another example, the database of 3D models of objects includes a search index, and the processor is also operable to store the system tag in the search index. In another example, the search term is a title of the point of interest. In another example, the processor is also operable to receive, from a device, a request for one or more 3D models of objects, the request including the search term; identify the system tag based on the received search term; identify the selected 3D model of the object based on the identified system tag; and transmit the selected 3D model of the object to the device.

Yet another aspect of the invention provides a computer-implemented method for generating tags. The method includes accessing a database of 3D models of objects, a plurality of the 3D models each being associated with a respective geographic location set including one or more geographic locations defining a boundary; accessing map information including geolocated points of interest; selecting a 3D model of an object associated with a first respective geographic location set defining a respective boundary; identifying, by a processor, a point of interest from the map information based on the first respective geographic location set; generating, by the processor, a system tag including a search term based on the identified point of interest; associating the system tag with the selected 3D model of an object; and storing the association in memory.

In one example, the first respective geographic location set defines the respective boundary of a building. In another example, identifying the point of interest from the map information is based on whether the identified point of interest is located within the geolocated boundary of the building. In another example, identifying the point of interest from the map information is based on whether the identified point of interest is located proximate to the geolocated boundary of the building. In another example, the selected 3D model of the object includes a building. In another example, the database of 3D models of objects includes a search index, and the method also includes storing the system tag in the search index. In another example, the search term is a title of the point of interest. In another example, the method also includes receiving, from a device, a request for one or more 3D models of objects including the search term; identifying, by the processor, the system tag based on the received search term; identifying the selected 3D model of the object based on the identified system tag; and transmitting the selected 3D model of the object to the device.

DETAILED DESCRIPTION

A server computer may identify and provide 3D models in response to a search request. In one example, a server may access a database of 3D models of various objects. Some or all of these 3D models may be associated with a geographic location. The server may select a 3D model of an object associated with a first respective geographic location.

The server may also access map information including geolocated points of interest. The server identifies a point of interest from the map information based on the first respective geographic location associated with the 3D model. The server then generates a tag including a search term which is based on the identified point of interest. This tag may be associated with the selected 3D models of an object and the association stored in memory accessible by the server.

Next, the server may receive, from a requesting client device, a request for one or more 3D models. The request may include the search term generated above. Based on the search term, the tag may be identified. In addition, because the server has identified the tag, the server may also identify the selected 3D model. The server may then transmit the selected 3D model to the requesting client device, for example, for display to a user.

Figure 1:
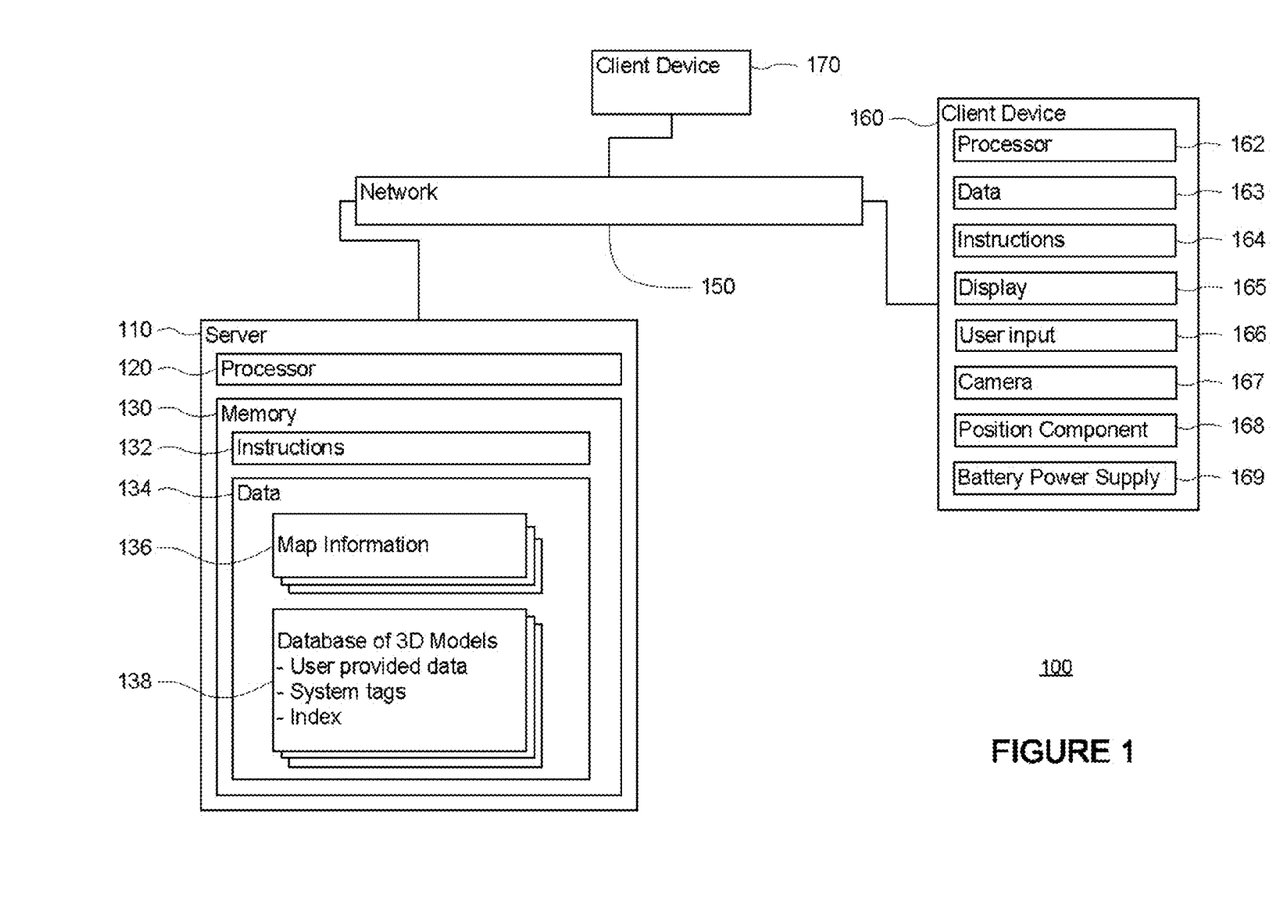
FIG. 1 is a functional diagram of a system in accordance with an aspect of the invention.
Figure 2:
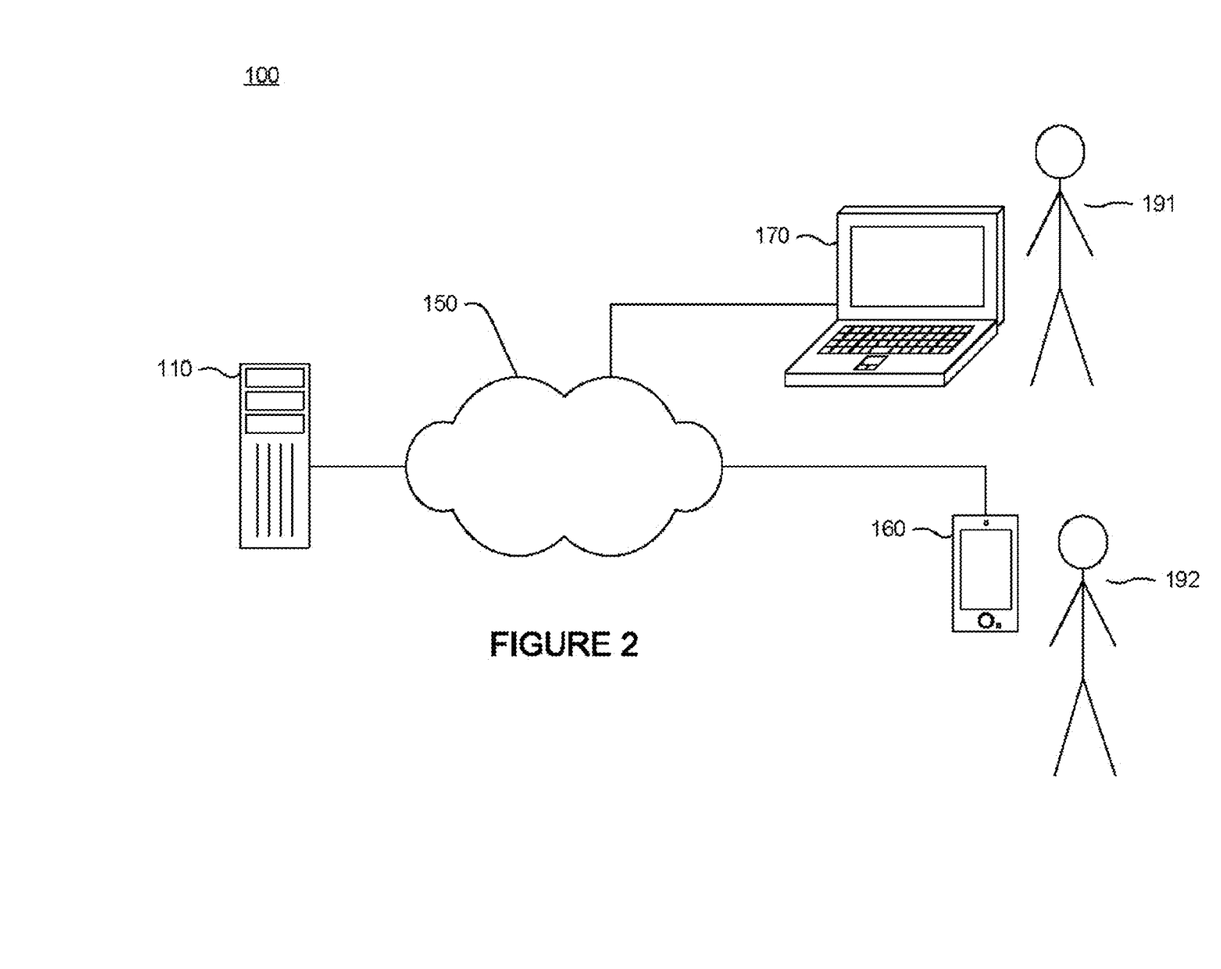
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory may include short term or temporary storage as well as long term or persistent storage. Systems and methods in accordance with aspects of the invention may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated controller such as an ASIC. Although FIG. 1 functionally illustrates the processor and memory as being within the same block, it will be understood that the processor and memory may actually comprise multiple processors and memories that may or may not be stored within the same physical housing. For example, memory may be a hard drive or other storage media located in a server farm of a data center. Accordingly, references to a processor, a computer, or a memory will be understood to include references to a collection of processors, computers, or memories that may or may not operate in parallel.

The computer 110 may be at one node of a network 150 and capable of directly and indirectly receiving data from other nodes of the network. For example, computer 110 may comprise a web server that is capable of receiving data from client devices 160 and 170 via network 150 such that server 110 uses network 150 to transmit and display information to a user on display 165 of client device 170. Server 110 may also comprise a plurality of computers that exchange information with different nodes of a network for the purpose of receiving, processing and transmitting data to the client devices. In this instance, the client devices will typically still be at different nodes of the network than any of the computers comprising server 110.

Network 150, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions as described above. Each client device 160 or 170 may be a personal computer intended for use by a person 191-192, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), end user input 166 (e.g., a mouse, keyboard, touch-screen or microphone). The client device may also include a camera 167, a position component 168, an accelerometer, speakers, a network interface device, a battery power supply 169 or other power source, and all of the components used for connecting these elements to one another.

Although the client devices 160 and 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, tablet PC or netbook capable of obtaining information via the Internet or other network. The user may input information using a small keyboard, a keypad, or a touch screen.

Data 134 of server 110 may include map information 136. The map information may include highly detailed maps identifying the geographic location of buildings, waterways, points of interest (POIs), the shape and elevation of roadways, lane lines, intersections, and other features. The POIs may include, for example, businesses (such as retail locations, gas stations, hotels, supermarkets, restaurants, etc.), schools, federal or state government buildings, parks, monuments, etc. The geographic location of these objects, for example POIs, may be a single latitude and longitude pair or point. This point may be selected by a user or administrator who defines the point of interest, or the point may be located based on some semantic significance appropriate to the application. For example, a POI may be located at the front door of a business the POI represents, which may be appropriate when viewing street level images. As described in more detail below, the map information may also be used to identify one or more POI for a given geographic area or location.

The server may also access a database 136 of 3D models of various objects. These 3D objects may be associated with data provided by the model's creator (or uploading user) or other users such as one or more categories, geographic locations, descriptions, user reviews, etc. In some examples the geographic location for a particular 3D model may be defined according to the actual object's position on Earth. The base polygon of a 3D model may be defined by latitude and longitude coordinates, or some 3D models may be associated with a single latitude and longitude pair, in some examples a centroid, within the polygon. The models may be associated with user-designated collections. For example, when a user uploads a new model to the database, the user may designate the model as part of one or more collections, such as "mid-century modern" or "stuff I like," which associated the new model with other models also associated with the same collection. This information may be used to index and search the database. As will be described in more detail below, the database may also include system tags which may also be used to identify, index, and query the models.

The database may be associated with a table or searchable index identifying each 3D model. The table or index may be used in order to identify specific 3D models in response to a search request including one or more search terms.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. The systems and methods may further translate locations from one reference system to another. For example, the client 160 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)). In that regard, it will be understood that exchanging or processing locations expressed in one reference system, such as street addresses, may also be received or processed in other references systems as well.

Various operations in accordance with aspects of the invention will now be described. It should also be understood that the following operations do not have to be performed in the precise order described below. Rather, various steps can be handled in a different order or simultaneously.

The server may select a model of the 3D models of objects. The selected model must be associated with a geographic location which is included in the map information. For example, the server may select model 310 shown in FIG. 3. In this example, the model includes associated data 320 which contains the geolocation information: "1234 Main Street, Big City, New State."

The server may then identify one or more POIs associated with, nearby, or contained within the bounds of the selected geolocated model. The server may identify one or more POIs of the map information at or near the given geographic location. For example, the server may use a strict geometric requirement rule. In this case, a POI (being a point) may be examined for whether or not it is contained within the boundary polygon of a 3D model. In another example, the server may use address matching using a land parcel map as an intermediary. In this case, if a 3D model's polygon is poorly geolocated but is associated with a certain address, the server may identify a land parcel based on the address and the land parcel map. The land parcel is another polygon which may also include a building. The building may therefore have the same address as the land parcel (and also the polygon), and the server may determine that the POI is within or should be associated with the 3D model. The server may also match the name of a POI (e.g. Taco Bell, Empire State Building) against the name of a 3D model, if known. In this case, the server may identify POI object by name matching within some buffer region surrounding the 3D model's base polygon. In yet another example, the server may receive information from users identifying a POI as within a 3D model. For example, when a user uploads the model to the database, the user may submit POIs or select nearby POIs from a predefined list. For example, if the geolocated object is a building, an identified POI may be located within the building (e.g. associated with the same address), in the courtyard of a building, or next to the building.

Figure 3:
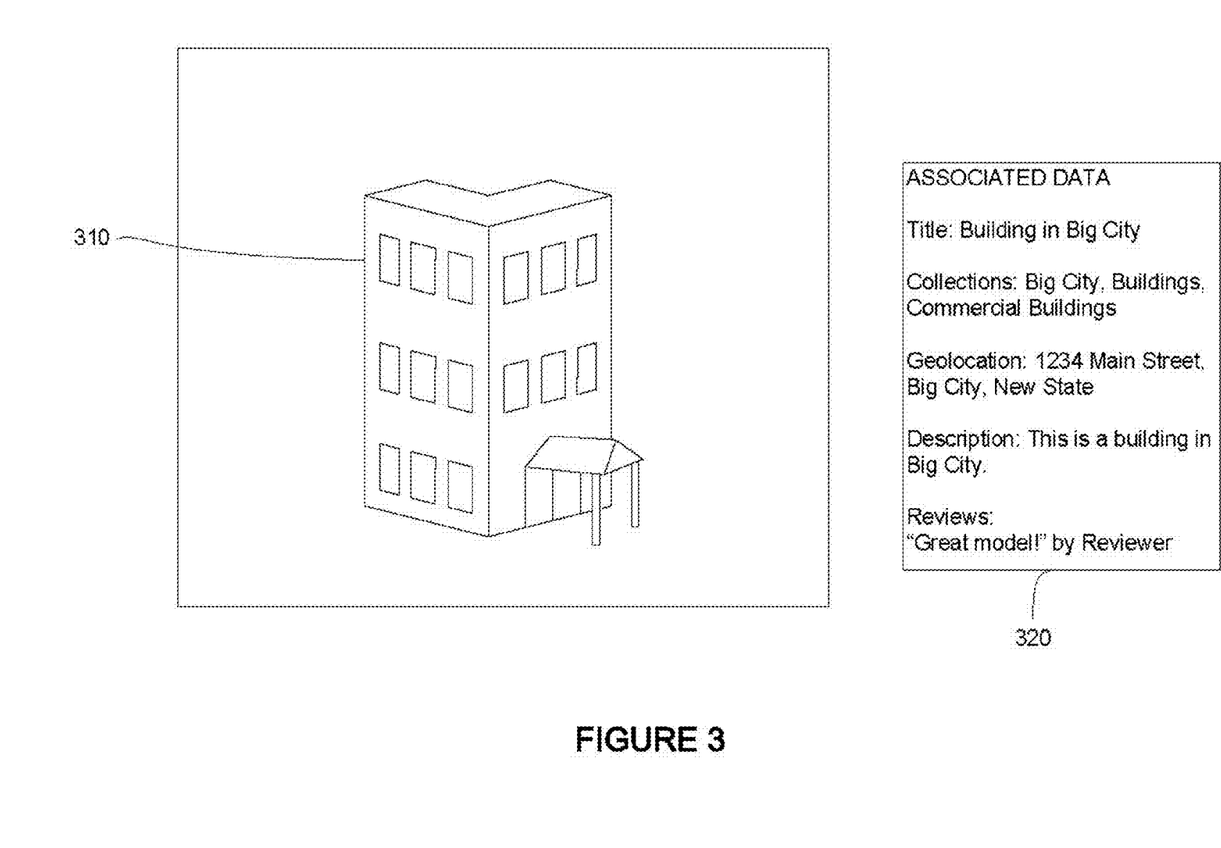
FIG. 3 is an exemplary 3D model with associated data in accordance with an aspect of the invention.
Figure 4:
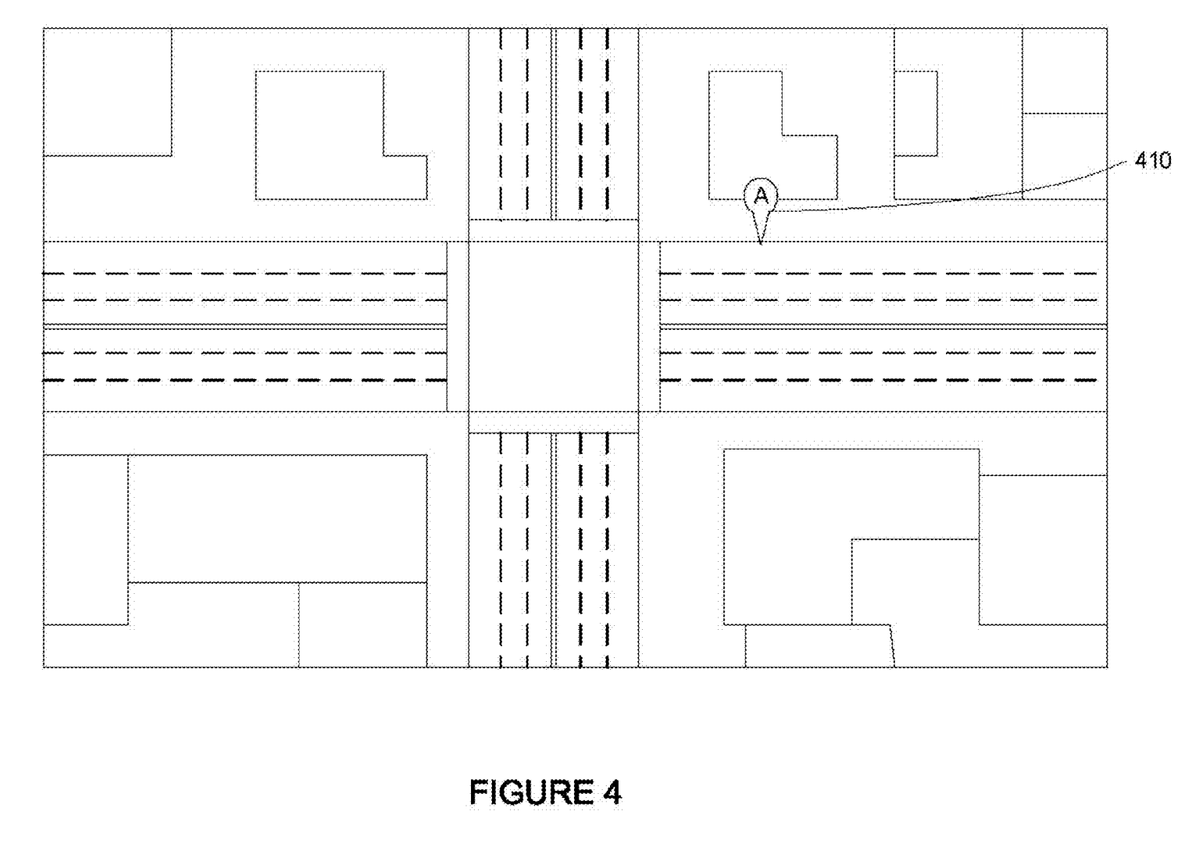
FIG. 4 is a map of exemplary data in accordance with an aspect of the invention.
Figure 5:
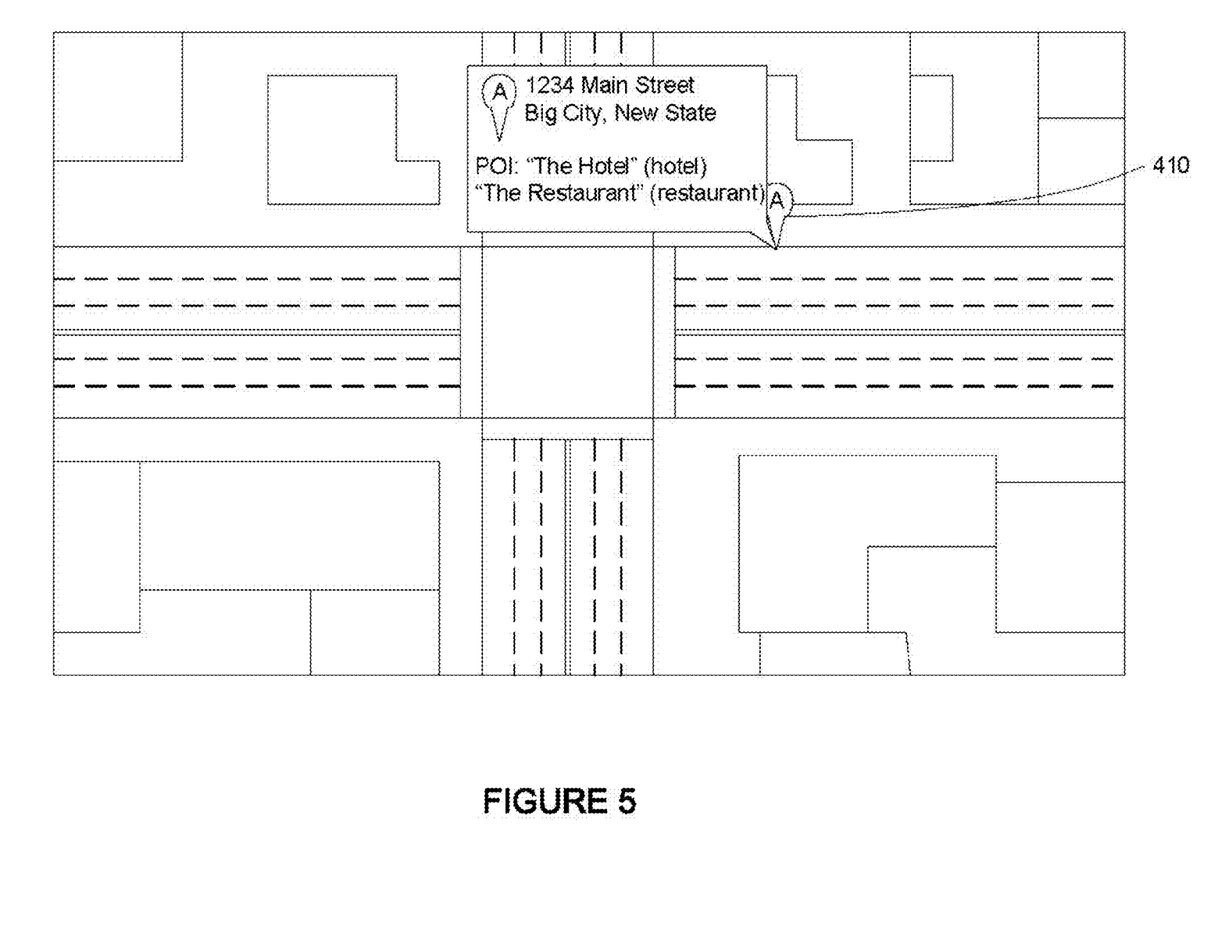
FIG. 5 is another map of exemplary data in accordance with an aspect of the invention.

Returning to the example of FIG. 3, the selected model is associated with the address "1234 Main Street, Big City, New State." Using this address, the server may identify POI at or near this address. Map pointer 410 of FIG. 4 depicts the map location of "1234 Main Street, Big City, New State." As shown in FIG. 5, this location (A) contains two POI, a hotel and a restaurant, "The Hotel" and "The Restaurant," respectively. It will be understood that the words "The Hotel" and "The Restaurant," as used herein are fictitious names of businesses although POIs may also include non-business entities or locations such as schools or parks.

Once the server has identified one or more POI, the server may generate one or more system tags and associate the tag(s) with the selected model. Returning to the example above, the server may generate two system tags, "The Hotel" and "The Restaurant," and associated these tags with model 310.

The system tags may be associated with the selected model and stored in memory. For example, the server may append the system tags "The Hotel" and "The Restaurant" to model 310. The system tags may also be associated with the model and stored in a table or searchable index. This may allow the model to be discoverable in response to a search request based on its physical contents rather than merely by searching the user provided data such as collections, titles, or descriptive data.

This process may be repeated for each of the geolocated models included in the database of 3D models. For example, the process may be done as a regularly scheduled, e.g. weekly, batch job. In another example, the tags may be determined each time a new POI is added.

The server may receive a request from a client device for models from the database of 3D models. The request may include one or more search terms. In response, the server may search the database in order to identify relevant 3D models. For example, the server may search the user provided data associated with the models for instances of the one or more search terms in order to identify relevant 3D models. Any identified models may be transmitted to the client device for display to the user.

In addition to searching the user provided data for the search terms, the server may also identify models based on the system tags. For example, the server may receive a request from a requesting client device for 3D models including the search terms "The Hotel." In response, the server may identify the system tag "The Hotel," and because of the association with model 310, the server may also identify model 310. This result may be transmitted to the requesting client device for display to the user.

Figure 6:
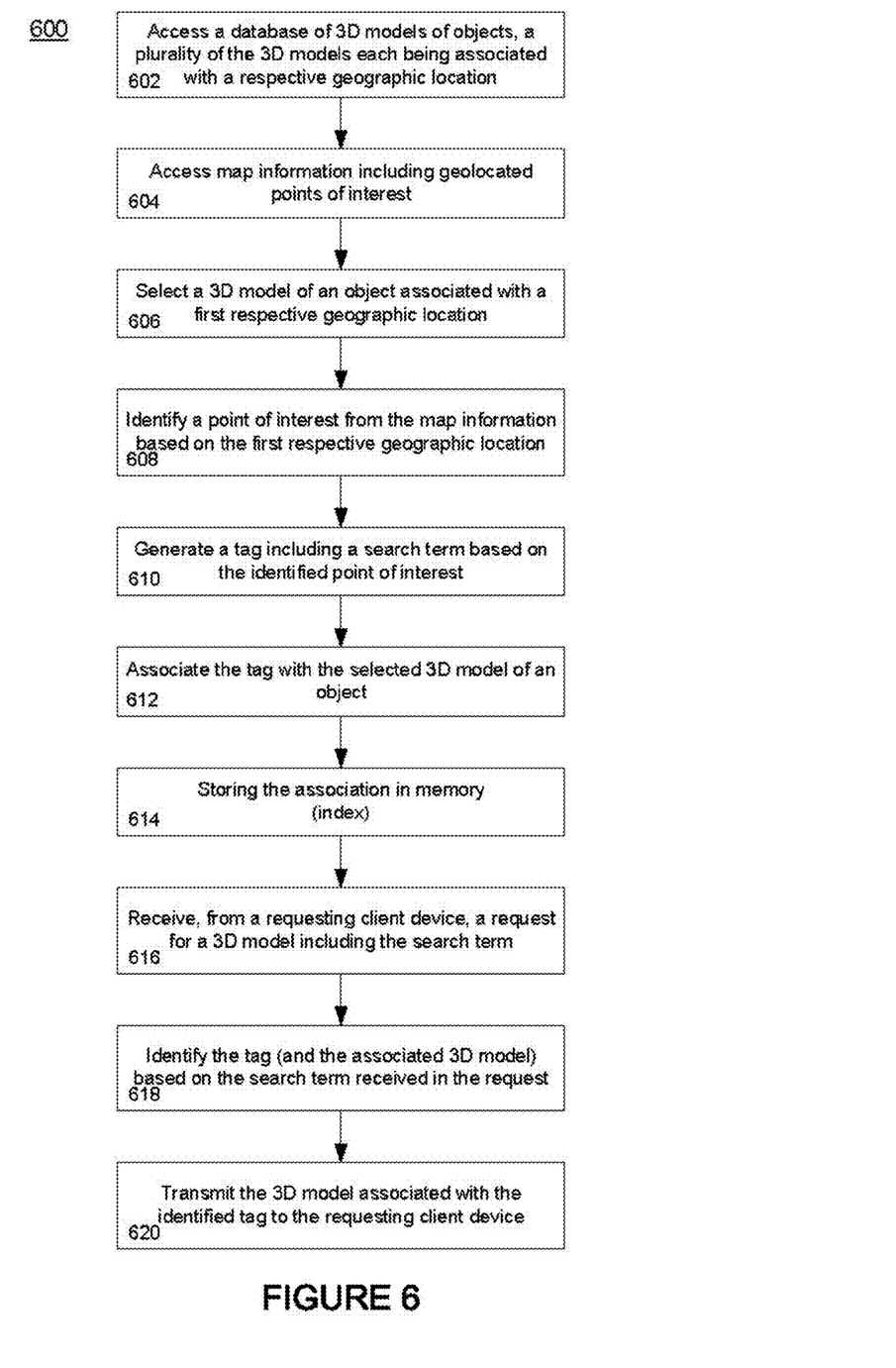
FIG. 6 is an exemplary flow diagram in accordance with an aspect of the invention.

FIG. 6 includes exemplary flow diagram 600 of the steps described above. For example, the server accesses a database of 3D models of objects at block 602. A plurality of the 3D models are each associated with a respective geographic location. The server also accesses map information including geolocated points of interest at block 604. The server then selects a models of an object associated with a first respective geographic location at block 606. The server identifies a point of interest from the map information based on the first respective geographic location at block 608. The server then generates a tag including a search term based on the identified point of interest at block 610. The server associates the tag with the selected 3D models of an object and stores the association in memory at block 612. In one example, the tag and association may be included in a searchable index.

After the tag has been associated with the selected 3D model and the association stored in memory, the server receives, from a requesting client device, a request for a 3D model at block 616. The request includes the search term. The server then identifies the tag based on the received search term at block 618. In addition, because the server has identified the tag, the server also identifies the selected 3D model. At block 620, the server transmits the 3D model associated with the identified tag to the requesting client device, for example, for display to a user.

In some examples, the system tag may correspond to or overlap with the user provided data or tags. When such a system tag aligns with a user-entered tag for a 3D model of an object, the server may have a higher confidence level that the system tag is an accurate description of the contents of the object of the 3D model. That is, if a user manually enters "The Hotel" and the server also determines that the geolocation of the 3D model includes this POI, it is more likely that both the user provided tag and the map information are correct. Similarly, if there are differences, this may be used to flag for further review spam models or models associated with false information.

Figure 7:
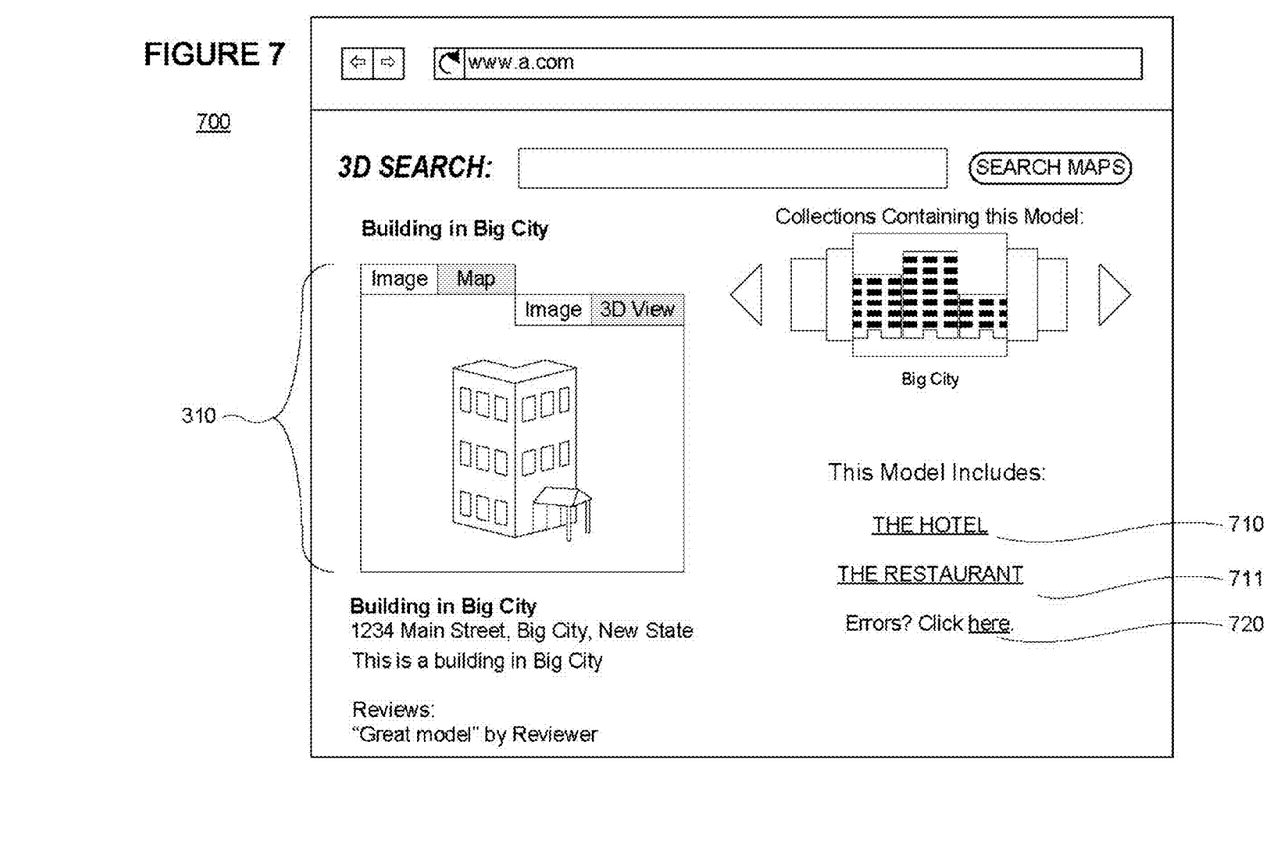
FIG. 7 is an exemplary screen shot in accordance with an aspect of the invention.
Figure 8:
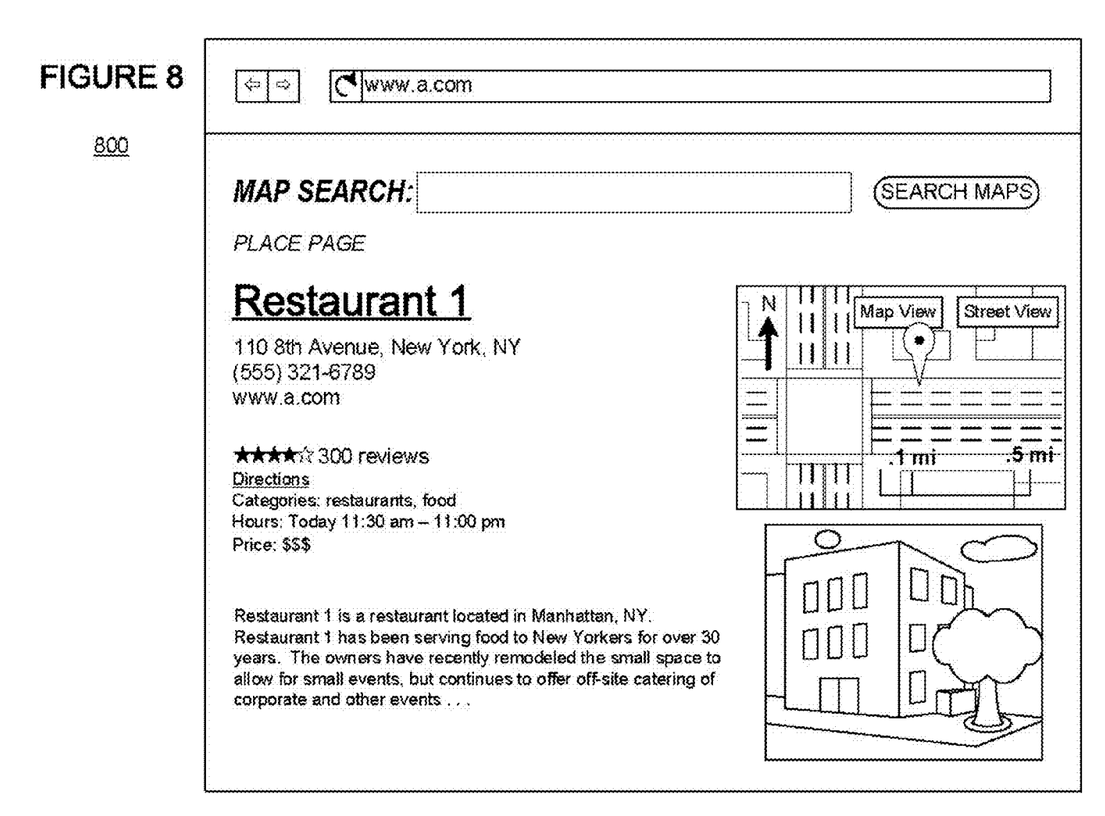
FIG. 8 is another exemplary screen shot in accordance with an aspect of the invention.

These system tags may also be shared with users. For example, as shown in FIG. 7 the system tags 710, 711 may be displayed on a model page 700. In some examples, the server may maintain a "place page" for a POI, for example, if the POI is a business. As shown in FIG. 8, a place page 800 may contain various types of information, such as contact information, hours, user reviews, etc. related to the business. In addition, returning to FIG. 7, each system tag 710, 711 may include a link from the model page to a place page (if one exists) associated with the POI of the system tag.

In order to reduce and correct errors in the systems tags as well as the map information, users may provide feedback to the server. For example, users may be able to select a feedback link 720 on the model page in order to identify errors. Alternatively, users may also edit the system tags, although verification of the user's identify may be required in order to prevent users from providing false or spam information.

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A method for generating tags, the method comprising:
   accessing a database including a plurality of 3D models of objects, wherein each 3D model of an object of the plurality of 3D models of objects is associated with information defining a geographic area of a base polygon of the respective object;
   accessing map information including a plurality of points of interest, where each point of interest of the plurality of points of interest is associated with a geographic coordinate;
   selecting a 3D model of an object from the plurality of 3D models of objects;
   determining, by a processor, whether the geographic coordinate of a given point of interest of the plurality of points of interest is within the geographic area of the base polygon defined by the information associated with the selected 3D model of the object;
   when the geographic coordinate of a given point of interest of the plurality of points of interest is within the geographic area of the base polygon defined by the information associated with the selected 3D model of the object, creating, by the processor, a system tag including a search term selected based on the given point of interest;

associating the system tag with the selected 3D model of an object; and storing the association in memory.

2. The method of claim 1, wherein the selected 3D model of the object represents a building and the geographic area of the base polygon defined by the information associated with the selected 3D model of the object represents a boundary of the building.

3. The method of claim 1, wherein the database further includes a search index, and the method further comprises storing the system tag in the search index.

4. The method of claim 1, wherein the search term is a title of the given point of interest.

5. The method of claim 1, further comprising:

receiving, from a device, a request for one or more 3D models of objects including the search term;

identifying, by the processor, the system tag based on the identified search term;

identifying the selected 3D model of the object from the database based on the received system tag; and transmitting the selected 3D model of the object to the device.

6. A computer comprising:

memory storing a database including a plurality of 3D models of objects, wherein each 3D model of an object of the plurality of 3D models of objects is associated with information defining a geographic area of a base polygon of the respective object, the memory also storing map information including a plurality of points of interest, where each point of interest of the plurality of points of interest is associated with a geographic coordinate; and a processor coupled to the memory and operable to:

select a 3D model of an object from the plurality of 3D models of objects;

determine whether the geographic coordinate of a given point of interest of the plurality of points of interest is within the geographic area of the base polygon defined by the information associated with the selected 3D model of the object;

when the geographic coordinate of a given point of interest of the plurality of points of interest is within the geographic area of the base polygon defined by the information associated with the selected 3D model of the object, create a system tag including a search term selected based on the given point of interest;

associate the system tag with the selected 3D model of an object; and store the association in the memory.

7. The computer of claim 6, wherein the selected 3D model of the object represents a building and the geographic perimeter represents a boundary of the building.

8. The computer of claim 6, wherein the database further includes a search index, and the processor is further operable to store the system tag in the search index.

9. The computer of claim 6, wherein the search term is a title of the given point of interest.

10. The computer of claim 6, wherein the processor is further operable to:

receive, from a device, a request for one or more 3D models of objects, the request including the search term;

identify the system tag based on the received search term;

identify the selected 3D model of the object from the database based on the identified system tag; and transmit the selected 3D model of the object to the device.

11. A non-transitory, tangible computer-readable storage medium on which computer readable instructions of a program are stored, the instructions, when executed by a processor, cause the processor to perform a method, the method comprising:

accessing a database including a plurality of 3D models of objects, wherein each 3D model of an object of the plurality of 3D models of objects is associated with information defining a geographic area of a base polygon of the respective object;

accessing map information including a plurality of points of interest, where each point of interest of the plurality of points of interest is associated with a geographic coordinate;

selecting a 3D model of an object from the plurality of 3D models of objects;

determining whether the geographic coordinate of a given point of interest of the plurality of points of interest is within the geographic area of the base polygon defined by the information associated with the selected 3D model of the object;

when the geographic coordinate of a given point of interest of the plurality of points of interest is within the geographic area of the base polygon defined by the information associated with the selected 3D model of the object, creating, by the processor, a system tag including a search term selected based on the given point of interest;

associating the system tag with the selected 3D model of an object; and storing the association in memory.

12. The medium of claim 11, wherein the selected 3D model of the object includes a building.

13. The medium of claim 11, wherein the database further includes a search index, and the method further comprises storing the system tag in the search index.

14. The medium of claim 11, wherein the search term is a title of the given point of interest.

15. The medium of claim 11, wherein the method further comprises:

receiving, from a device, a request for one or more 3D models of objects including the search term;

identifying, by the processor, the system tag based on the identified search term;

identifying the selected 3D model of the object from the database based on the received system tag; and transmitting the selected 3D model of the object to the device.

* * * * *